H. PLUMMER, dec'd.,

PLUMMER SEWING-MACHINE COMPANY, Assignee by mesne assignments.

Feeding Devices for Straw Braid Sewing-Machines.

No. 9,083. Reissued Feb. 17, 1880.

Witnesses:
Geo. D. Byington
J. E. Carpenter

Inventor:
Plummer Sewing Machine Co
William E. Doubleday President
by H. A. Doubleday atty

N. PETERS, PHOTO-LITHOGRAPHER, WASHINGTON, D. C.

H. PLUMMER, dec'd.,

PLUMMER SEWING-MACHINE COMPANY, Assignee by mesne assignments.

Feeding Devices for Straw Braid Sewing-Machines.

No. 9,083. Reissued Feb. 17, 1880.

Witnesses:
N. N. Low
J. S. Barker.

Inventor:
Plummer Sewing Machine Co
William E. Doubleday President
by W. A. Doubleday atty

N. PETERS, PHOTO-LITHOGRAPHER, WASHINGTON, D. C.

UNITED STATES PATENT OFFICE.

PLUMMER SEWING MACHINE COMPANY, OF BROOKLYN, N. Y., ASSIGNEE, BY MESNE ASSIGNMENTS, OF HIRAM PLUMMER, DECEASED.

FEEDING DEVICE FOR STRAW-BRAID SEWING-MACHINES.

SPECIFICATION forming part of Reissued Letters Patent No. 9,083, dated February 17, 1880.

Original No. 93,553, dated August 10, 1869. Application for Reissue filed May 26, 1879.

DIVISION B.

*To all whom it may concern:*

Be it known that HIRAM PLUMMER, deceased, formerly of Brooklyn, in the county of Kings and State of New York, did invent certain new and useful Improvements in Feeding Devices for Straw-Braid Sewing-Machines; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

The invention for which protection is sought in this division of reissue relates to a novel construction of devices for feeding material to the needle of a sewing-machine, said devices being especially adapted to feeding braids of straw or other material in the formation of hats and bonnets.

Figure 1:
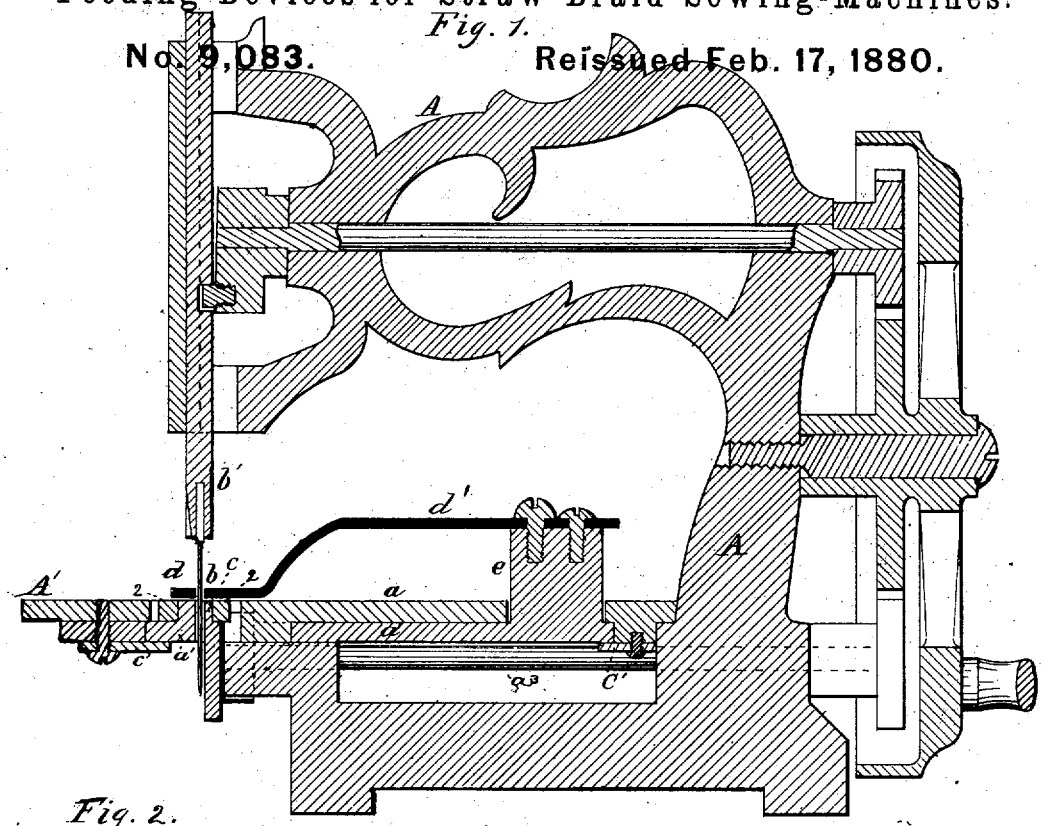
Figure 2:
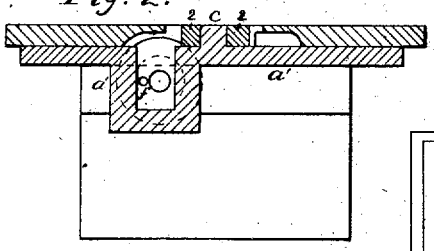
Figure 3:
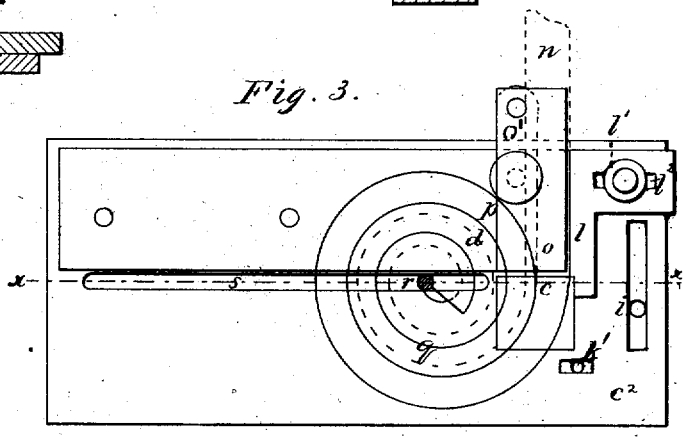
Figure 4:
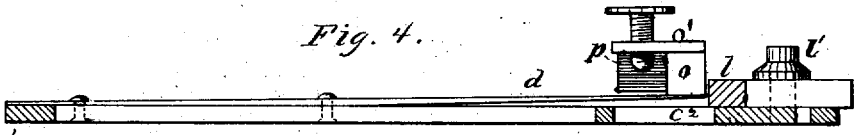
Figure 5:
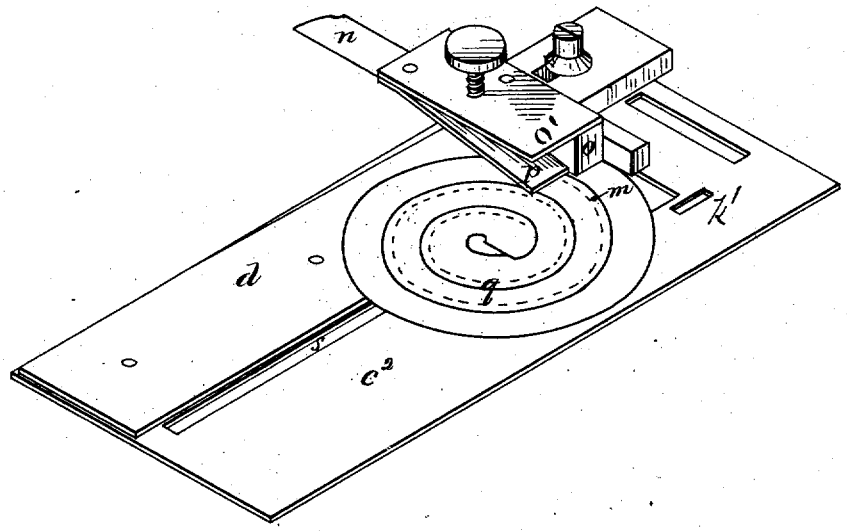

Figure 1 is a vertical section illustrating the improved feed as applied to sewing-machines. Fig. 2 is a sectional view illustrative of means for giving movement to the feeding mechanism. Fig. 3 is a plan; and Fig. 4 is a sectional view at the line $x$, Fig. 3; and Fig. 5 is a perspective view, detached, of the device shown in Figs. 3 and 4.

Similar letters of reference denote the same parts in all the figures.

Sewing-machines have heretofore been made in which the feed has been effected by a lateral movement of the needle while in the cloth, the cloth being held by spring-pressure between stationary surfaces. The cloth has also been moved by the joint action of a roughened reciprocating surface, a yielding stationary surface, and the needle. One or two wheels or rollers have also been employed and moved progressively. A four-motioned feed has also been used, striking the feed-surface against the cloth, moving it, withdrawing the feed-surface, and returning. A reciprocating pawl-action presser-foot has also been employed. These features have all been tested, and there are some objectionable features. Most all of them allow one of the thicknesses of the cloth to be forced along by the feed faster than the other, or else the needle or fabric is liable to injury and the feed is unreliable. A sewing-machine feed has also been made with two spring-arms extending at right angles to the slide to which they are affixed, and to which slide the movement is communicated by cams to feed the fabric through the agency of the movement of the arms laterally. When arranged in this manner there is sometimes considerable distance between the actuating-cam and the point where the feed clamps the fabric; hence the feed will not be reliable, because any looseness of the parts or lateral spring of the arm may vary the length of the stitch.

Referring to Figs. 1 and 2, $a$ is the bed of any sewing-machine to which the feed may be applied, A A being the upwardly and forwardly projecting arm or standard which supports the needle $b$, the needle-bar $b'$, and the mechanism which operates them; and wherever in this patent the words "inside the vertical plane of the needle" are used they mean between the arm or standard A and the vertical plane of the needle prolonged to intersect the path traversed upon the bed-plate of the machine by that portion of the unsewed braid which is being fed to the needle, and whenever the words "outside the plane of the needle" are used in this patent they mean between the vertical plane of the axis of the needle and the side or end A′ of the bed of the machine.

$a'$ is the lower member of the feeding-clamp, and $d'$ is the upper member thereof. These are connected together so as to seize the cloth with the desired pressure and be moved together.

I have represented in Figs. 1 and 2 the member $a'$ as moving beneath the bed in slides $c'$ and connected by the column $e$ with the member $d'$, so that they move together, and the motion is communicated by a revolving pin, $f$, attached to one end of shaft $a^4$ and working in a slot made in the member $a'$. The lower member is shown with a ring-formed bed, 2, around the portion $c$ of the member $a'$, that has the slot for the needle, this ring being fitted so as to turn freely and facilitate the turning of the cloth or goods between the upper and lower members of the feeding-clamp, and at the same time present a sufficient bearing-surface for supporting the cloth.

The upper member, $d'$, might be similarly fitted with a ring, if desired.

The feeding-clamp shown in Figs. 3, 4, and 5 is especially adapted for sewing braids or strips of material together in the manufacture of hats and bonnets, and can be applied advantageously to the sewing-machine patented by HIRAM PLUMMER, July 14, 1868; but this use is in no manner limited to that machine, but it may be applied to other sewing-machines.

The lower member, $c^2$, is made as a plate, and the upper member, $d$, consists of a thin tongue, and is attached thereto. Both thicknesses of material to be united, if in the form of strips, might pass between the members $c^2$ $d$. These members may be guided by a rib or pin, $i$, on the bed of the machine, entering the slot in the member $c^2$, and the pin or other device employed for reciprocating the device may be applied at the slot $k'$ or other convenient place.

The gage $l$ is made adjustable on the member $c^2$ by means of the set-screw $l'$, which passes through a slot, $l^2$, in the gage and into the member $c^2$, so that the distance between this gage and the path of the needle may be adjusted, and one edge of the unsewed strip $n$ of braid runs in contact with this gage as each convolution of braid is added to the sewed fabric, as is plainly shown in Fig. 3.

This device, as before stated, is specially adapted for sewing braids for hats and bonnets, in which case the piece of braid passes in between the members $c^2$ and $d$, as shown, and that portion of the material that has been sewed lies above the member $d$, with its edge against the gage $o$, that is attached to member $d$.

It will be seen by an examination of Figs. 3, 4, and 5 that the gage $o$ is supported by the member $d'$ above the unsewed braid, and that, while the outer edge of this unsewed braid which is being fed to the needle runs in contact with the gage $l$, the opposite edge of this unsewed braid may project under the sewed fabric to such distance as shall insure a proper lap for the seam.

$p$ is an auxiliary spring-presser acting upon the surface of the sewed fabric represented by coiled crown-piece $q$, as shown. The guide-pin $r$ passes through the center of the coil of braid into the slot $s$ and into a slot in the bed beneath, so that it becomes a center upon which the braid turns as it is sewed up to form the crown-piece, and also a center upon which the clamp can swing as it is moved by the pin in slot $k'$ in feeding the material.

The braid, being held by the needle, is bent into a curve by the members $c^2$ $d$ and gage $l$ swinging back on the pin $r$ previous to feeding the material forward at the next movement, and the gages $o$ and $l$ maintain a perfectly-correct width of braid exposed in the coil. The center-pin $r$, continually working back as the sewing progresses, causes the point on which the members $c^2$ and $d$ swing to be the center of the article being sewed, and at the same time the braid lies closely and correctly against the gages.

In sewing hats the crown-piece can be sewed as aforesaid. The braid will be laid together with great regularity in the spiral form by the gages before described, and when the side of the crown is to be sewed the same is performed by turning up the crown-piece edgewise and sewing the braid as before until the same is of proper size. The crown-piece will be wrong side out, and is to be turned, and then the brim sewed upon its edge, the operation being performed as aforesaid.

This feeding device may be fitted with any desired character of guides for turning hems, guiding tucks or plaits, braiding, or performing any other desired character of sewing.

The surface of the members of the feeding-clamp may be smooth or more or less roughened, and the spring-pressure of the clamps may be adjusted, if desired.

I do not claim a sewing-machine feed formed of two members, whether their engaging faces are plain, circular, roughened, or flat, as these have before been employed, and they have in some circumstances moved together.

It will be readily understood that by thus forming the hat by the addition of successive convolutions, commencing at the center crown-piece, upon the machine shown and described in this patent, and having the gages which guide the work to the needle constructed and arranged as shown in Figs. 3, 4, and 5, the hat, during the process of sewing, is always outside the path of the needle, whereby the turning of the same at an angle to the bed of the machine for the purpose of forming the sides of the crown and their manipulations are greatly facilitated.

I do not, in this division of reissue, claim the construction or arrangement of the gages, or either of them, which are shown in Figs. 3, 4, and 5, as these features constitute the subject-matter of Division A. Nor do I claim, broadly, the employment of a feeding mechanism consisting of the two members $a'$ $d'$, having their outer ends arranged in the path of the needle, being aware that such a construction has been heretofore employed; but What I do claim is—

1. In combination with the bed-plate of a sewing-machine, the herein-described feeding-clamp, consisting of the lower member, $a'$, provided with projection $c$ and ring 2, in combination with the upper member, $d'$, the connecting-column *e*, and mechanism for reciprocating the members, substantially as set forth.

2. The combination of the upper member, *d*, the column *e*, the lower member, *a'*, constructed with a slot to receive the crank-pin *f*, and the shaft $a^3$, provided with pin *f*, which actuates the clamp, substantially as set forth.

In testimony that I claim the foregoing I have hereunto set my hand this 3d day of May, 1879.

WM. E. DOUBLEDAY,
*President Plummer Sewing Machine Co.*

Witnesses:
H. H. DOUBLEDAY,
JAS. G. COOPER.